United States Patent
Schäfer

(10) Patent No.: US 7,090,095 B2
(45) Date of Patent: Aug. 15, 2006

(54) STORAGE/TRANSPORT BOX WITH REMOVABLE HINGED COVER

(75) Inventor: Gerhard Schäfer, Neuenkirchen (DE)

(73) Assignee: Fritz Schafer GmbH, Neunkirchen (DE)

( * ) Notice: Subject to any disclaimer, the term of this patent is extended or adjusted under 35 U.S.C. 154(b) by 0 days.

(21) Appl. No.: 10/844,807

(22) Filed: May 12, 2004

(65) Prior Publication Data

US 2005/0103796 A1 May 19, 2005

(30) Foreign Application Priority Data

Nov. 19, 2003 (DE) .......................... 203 17 866 U

(51) Int. Cl.
*B65D 51/04* (2006.01)

(52) U.S. Cl. ..................... 220/826; 220/812; 16/262

(58) Field of Classification Search ................ 220/826, 220/812, 815, 822, 847, 848; 16/257, 262, 16/259, 270–272, 382, 383; B65D 43/16
See application file for complete search history.

(56) References Cited

U.S. PATENT DOCUMENTS 3,592,354 A * 7/1971 Nielsen ....................... 220/847
3,689,115 A * 9/1972 Andreini et al. ............... 292/87
4,863,062 A * 9/1989 Holliday ...................... 220/845
5,294,413 A * 3/1994 Riihimaki et al. ........... 422/297
5,381,920 A * 1/1995 Lin ............................. 220/843
6,321,414 B1 * 11/2001 Buchanan et al. ............ 16/257
6,454,097 B1 * 9/2002 Blanco ........................ 206/570

FOREIGN PATENT DOCUMENTS

| DE | 9408377 | 9/1994 |
|----|---------|--------|
| DE | 20304628 | 7/2003 |
| FR | 2809090 | 11/2001 |

* cited by examiner

Primary Examiner—Lien M. Ngo
(74) Attorney, Agent, or Firm—Andrew Wilford

(57) ABSTRACT

A reusable transport/storage box has a side wall having a horizontal upper flange formed with a longitudinally extending and vertically throughgoing slot having a predetermined longitudinal effective length and formed with a transversely inwardly open short cutout. A cover panel is pivoted on an upper part of an insert hinge having a flat insert tongue projecting downward from the upper part, fittable through the slot, and of an effective length shorter than the slot longitudinal effective length. A short bump projects transversely and outwardly from the tongue and can fit vertically through the cutout. The tongue is insertable through the slot with the bump passing through the cutout and then is longitudinally shiftable to displace the bump at least partially past the cutout underneath the upper flange and thereby lock the hinge to the upper flange.

12 Claims, 6 Drawing Sheets

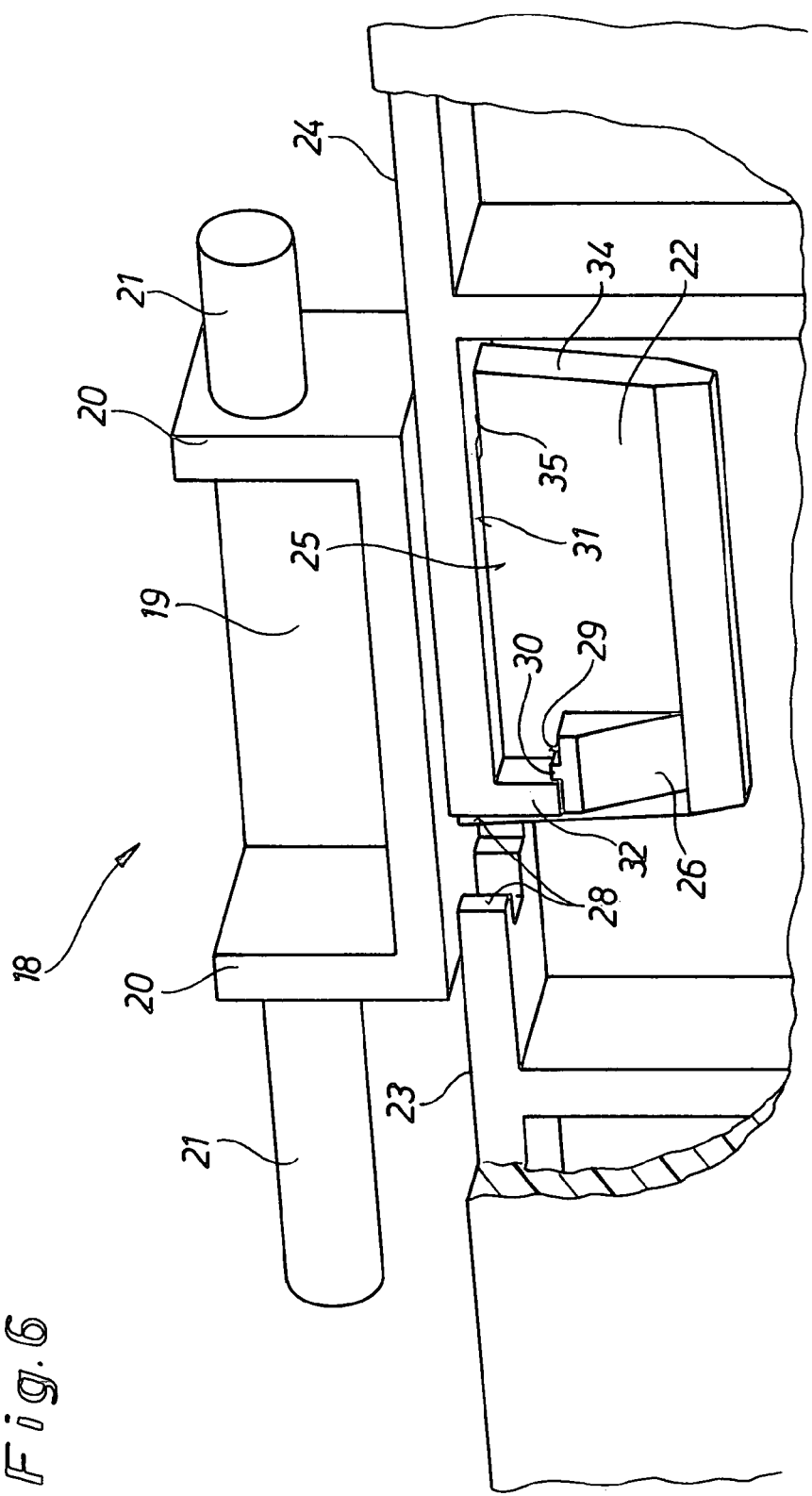

STORAGE/TRANSPORT BOX WITH REMOVABLE HINGED COVER

FIELD OF THE INVENTION

The present invention relates to a reusable storage/transport box. More particularly this invention concerns such a box having a hinged cover or covers.

BACKGROUND OF THE INVENTION

A standard reusable transport/storage box, typically made of injection-molded plastic, has a floor, a pair of upstanding long side walls, and a pair of short upstanding end walls that bridge ends of the side walls. The upper edges of the walls are thickened, typically by forming each edge with an outwardly projecting integral upper flange in turn having an outer edge formed with a downwardly projecting outer flange. The walls are formed as isosceles trapezoids with their larger ends up so that the boxes can be nested.

When such a box is to be provided with a cover it is known as described in German utility model 94 08 377 to provide each of two identical cover panels with a plurality of so-called insert hinges that attach the cover panels to the upper flanges of the side walls. Each such insert hinge has an upper part that is pivoted on the outer edge of the respective cover panel and a downwardly projecting tongue having transversely projecting barbs. The upper flange is formed with throughgoing holes complementary to the tongues so that the tongues of the insert hinges can be forced through the holes until the barbs lock underneath the upper flange, thereby solidly securing the insert hinges to the box rim.

While such a system has the advantage that it is quite easy to retrofit a box with cover panels, which in fact are normally made so they can be separated from the insert-hinge upper parts if desired, it is extremely difficult or impossible to remove the hinges if they are no longer needed or need to be replaced. Prying out an insert hinge normally damages the upper flange and/or the barbs on the tongue.

OBJECTS OF THE INVENTION

It is therefore an object of the present invention to provide an improved reusable storage/transport box.

Another object is the provision of such an improved reusable storage/transport box which overcomes the above-given disadvantages, that is whose insert hinges can be removed and replaced without damage to the box.

SUMMARY OF THE INVENTION

A reusable transport/storage box has according to the invention a side wall having a horizontal upper flange formed with a longitudinally extending and vertically throughgoing slot having a predetermined longitudinal effective length and formed with a transversely inwardly open short cutout. A cover panel is pivoted on an upper part of an insert hinge having a flat insert tongue projecting downward from the upper part, fittable through the slot, and of an effective length shorter than the slot longitudinal effective length. A short bump projects transversely and outwardly from the tongue and can fit vertically through the cutout. The tongue is insertable through the slot with the bump passing through the cutout and then is longitudinally shiftable to displace the bump at least partially past the cutout underneath the upper flange and thereby lock the hinge to the upper flange.

Thus with this system, shifting the hinge longitudinally to align the bump with the cutout makes it possible to pull the hinge out of the box rim without damage to the rim. When, however, the cover is in place and closed, the hinge cannot shift longitudinally so the box is secure.

The bump according to the invention is wedge-shaped. In addition it has an upper face formed with an upwardly projecting ridge that is located centrally in the bump upper face. This ridge can fit in a complementary seat in a lower face of the upper flange in the locked/installed position of the insert hinge. Alternately, the upper flange is formed at a longitudinal end of the cutout with a downwardly projecting locking tab. The ridge moves from one longitudinal side of the tab to an opposite longitudinal side on longitudinal sliding of the tongue in the slot. Thus this ridge prevents inadvertent release of the hinge, but the hinge can still be shifted to its removal/installation position by elastic deformation of the tab and/or of the ridge with no damage to the structure.

For most secure locking of the hinge to the box, the tongue has two transversely oppositely directed faces each provided with one such bump and ridge. The upper flange is similarly formed with two such cutouts and to each side of the slot with one such locking tab.

The tongue according to the invention has a lower portion of a longitudinal dimension substantially greater than the predetermined longitudinal effective length. More particularly, the tongue has a longitudinally open notch at a level where the effective length of the tongue is determined. When shifted longitudinally, the upper inner flank of this notch bears upward on the upper wall flange, solidly locking the insert hinge to the box.

The upper part has at least one pivot pin seated in the cover panel. In addition it has a lower face flatly engageable with an upper surface of the upper flange.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 4, 5, and 6 are views like FIG. 3 showing the FIG. 3 hinge in successive stages of installation.

SPECIFIC DESCRIPTION

Figure 1:
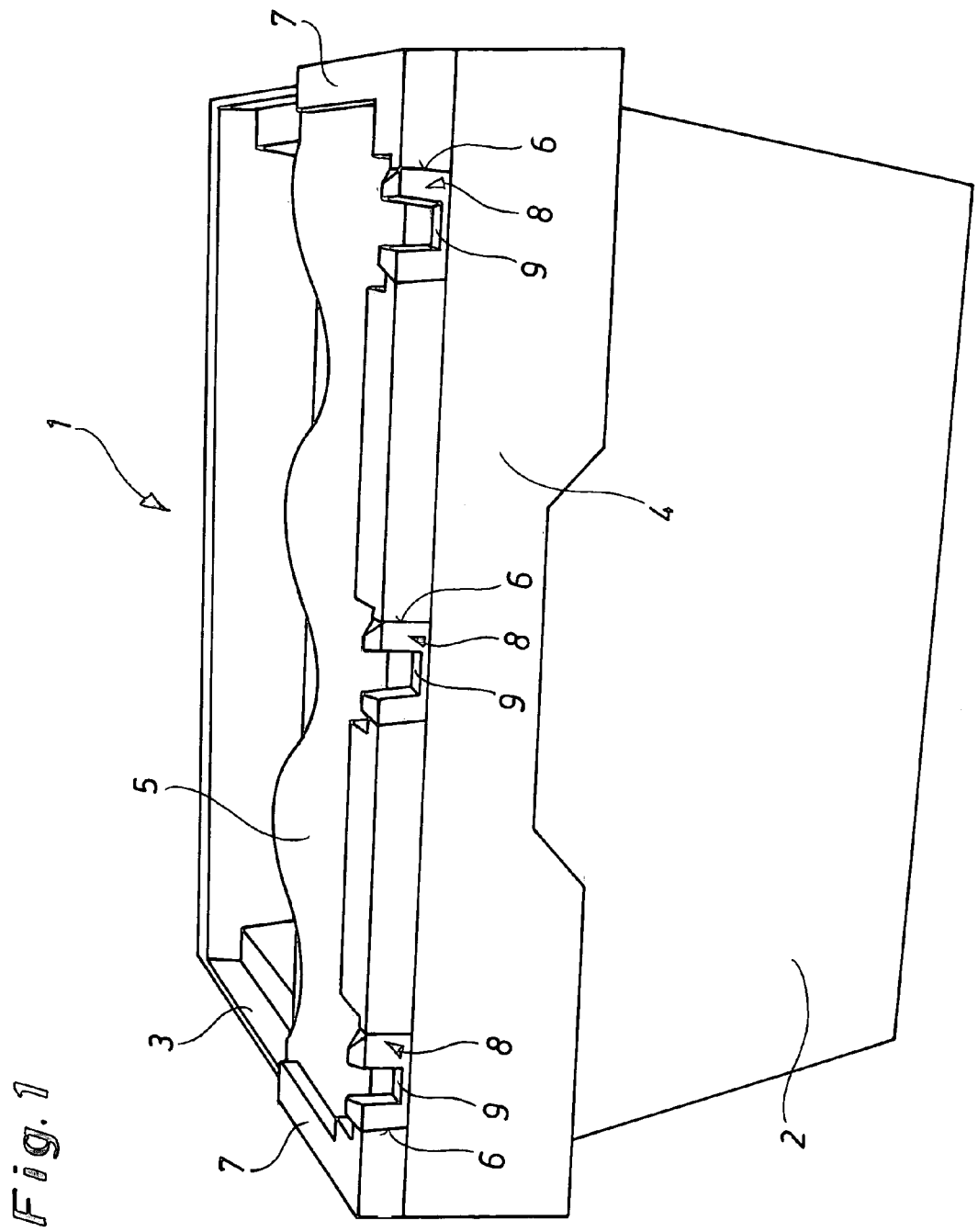
FIG. 1 is a perspective view of a box according to the invention.
Figure 2:
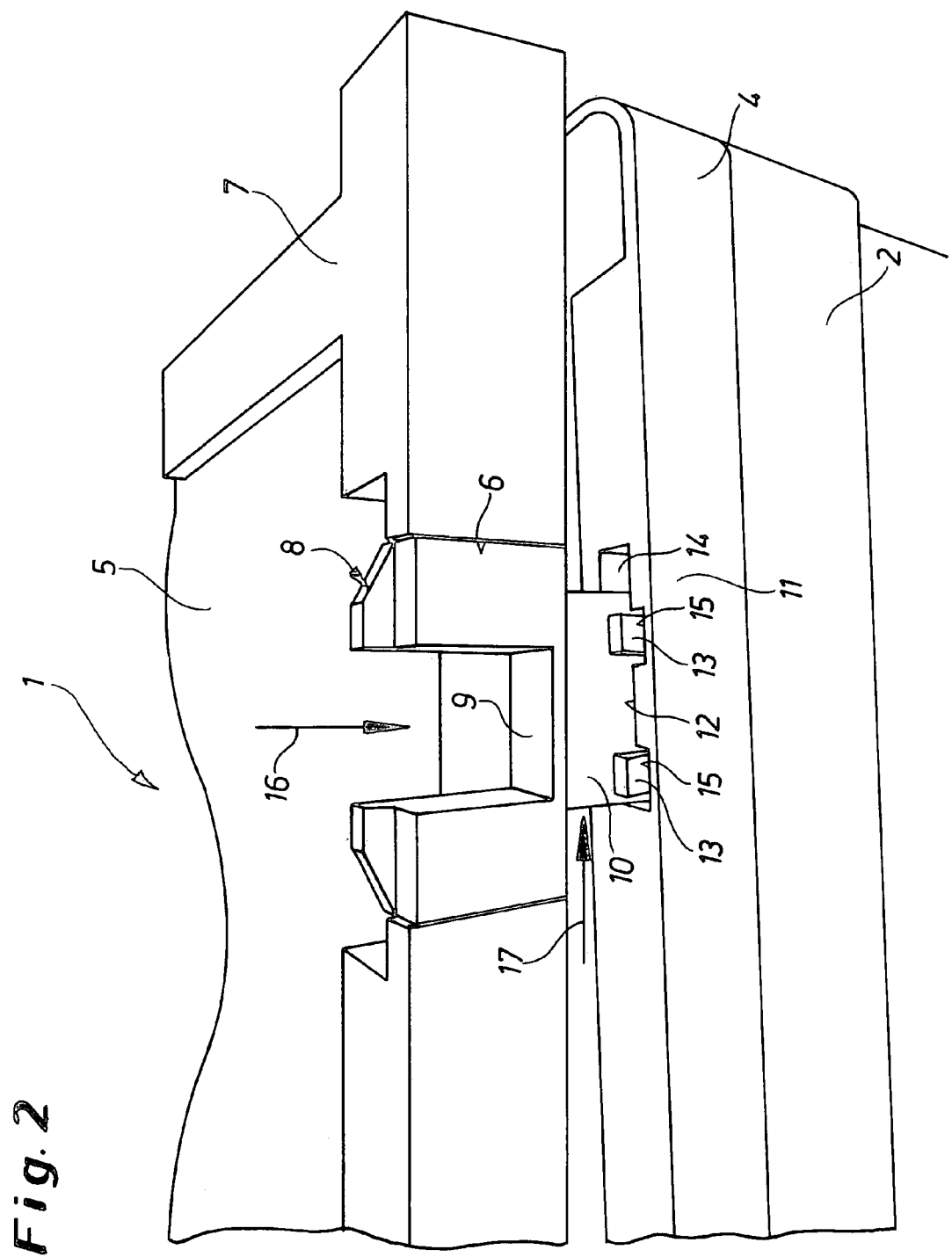
FIG. 2 is a large-scale view of a detail of the FIG. 1 box showing one of its insert hinges in partially installed condition.

As seen in FIGS. 1 and 2, a reusable transport/storage box 1 has long vertical side walls 2 and short vertical end walls 3 bridging the side walls 2. A thickened upper rim 4 formed with a downwardly projecting flange 11 extends all around the upper edges of the walls 2 and 3. One of two cover panels 5 is shown that is connected at a thickened edge 7 to one of the side walls 2 at the rim 4 by three insert hinges 8.

Unillustrated longitudinally projecting pivot pins on the hinges 8 allow the cover 5 to pivot on the side wall 2 about a longitudinal axis.

Each such hinge 8 as shown in FIG. 2 has a U-shaped upper part 9 sitting in a complementary upwardly open notch 6 formed in the thickened outer edge 7 of the cover 5 and a downwardly projecting tongue 10 that extends down through a vertically throughgoing longitudinal slot 14 formed in an upper flange of the rim 4. The slot 14 has a width corresponding to that of the tongue 10 but a length that is somewhat greater than the tongue's effective length so that, as will be described below, the tongue 10 can move longitudinally in the slot 14.

An outer face of the tongue 10 carries a pair of downwardly tapering wedge-shaped bumps 13 having outer faces that converge with the outer face of the tongue 10 and upper faces that are perpendicular thereto. An inner edge 12 of the slot 14 is formed with a pair of generally complementary inwardly open cutouts or notches 15 spaced longitudinally the same as the wedges 13.

The insert hinge 8, which itself is pivoted on the cover edge 7, is secured to the side wall 2 by aligning the tongue 10 with the slot 14 and the wedges 3 with the notches 15, then pushing it down as shown by arrow 16 until the upper faces of the wedges 13 are below the lower face of upper flange of the rim 4. Then the hinge 8 is shifted longitudinally as shown by arrow 17 to move the wedges 13 underneath this upper flange and lock the hinges 8 to the rim 4.

Removal of the hinge 8 is effected by reversing these steps, that is by shifting the hinge 8 longitudinally opposite the direction 17, then raising it opposite the direction 16. Thus it is possible to remove the hinge 8 without damaging the box 1. Nonetheless when the cover 5 is closed, such longitudinal movement is impossible, so there is no likelihood of the box coming apart unintentionally.

FIGS. 3 to 6 show another hinge 18 according to the invention. It has an upper part 19 with a pair of upstanding flanges 20 from which extend pivot pine 21 that fit with unillustrated complementary seats on a cover like the cover 5 of FIGS. 1 and 2. Projecting downward from the upper part is a downwardly slightly tapered tongue 22 that is dimensioned to fit in a slot 27 formed in an upper flange or wall 23 of a side wall of the box, the slot 27 being of roughly the same thickness and width as a lower region of the tongue 22.

An inner face 25 of the tongue 22 carries a wedge 26 having a flat upper surface 29 from which a locking ridge 30 projects upward. The slot 27 is formed with a complementary cutout or notch 28 through which the wedge 26 can move downward. To one side of this notch 28 a pair of tabs 32 and 33 project downward from a lower surface 31 of the wall 23. In addition the tongue 22 is formed at an edge 34 remote from the tongue 26 immediately underneath the upper part 19 with a longitudinally open locking notch 35 having a vertical dimension equal roughly to the thickness of the top wall 23. There are two tabs 32 and 33 because an outer face of the tongue 22 opposite the face 25 has another such wedge 26 that is not shown here. The tongue 22 has a longitudinal length below the cutout 35 that is generally equal to that of the slot 27 but an effective length at the cutout 35 that is substantially shorter.

Figure 3:
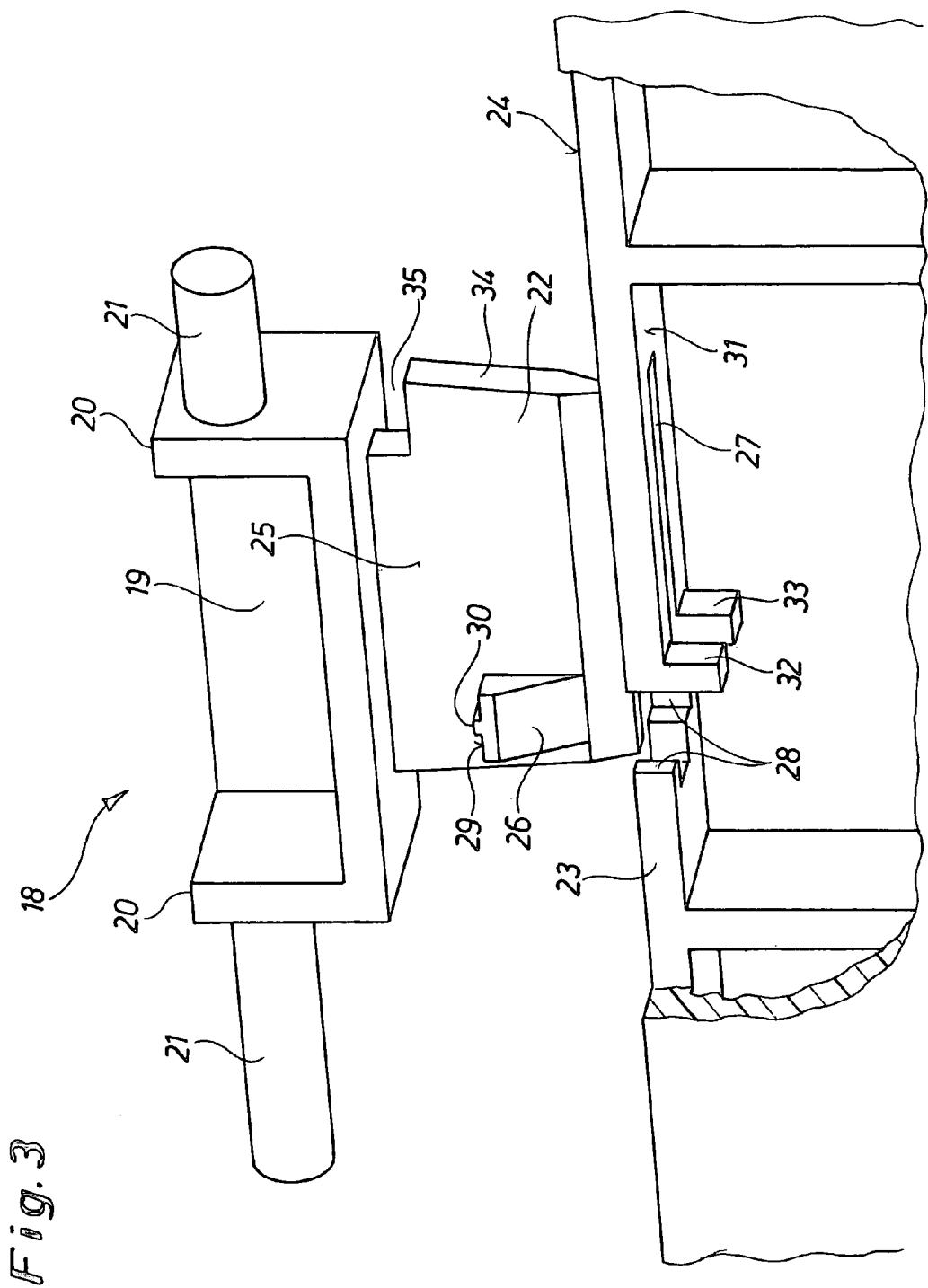
FIG. 3 is a perspective view from the interior of another insert hinge in accordance with the invention prior to installation.
Figure 4:
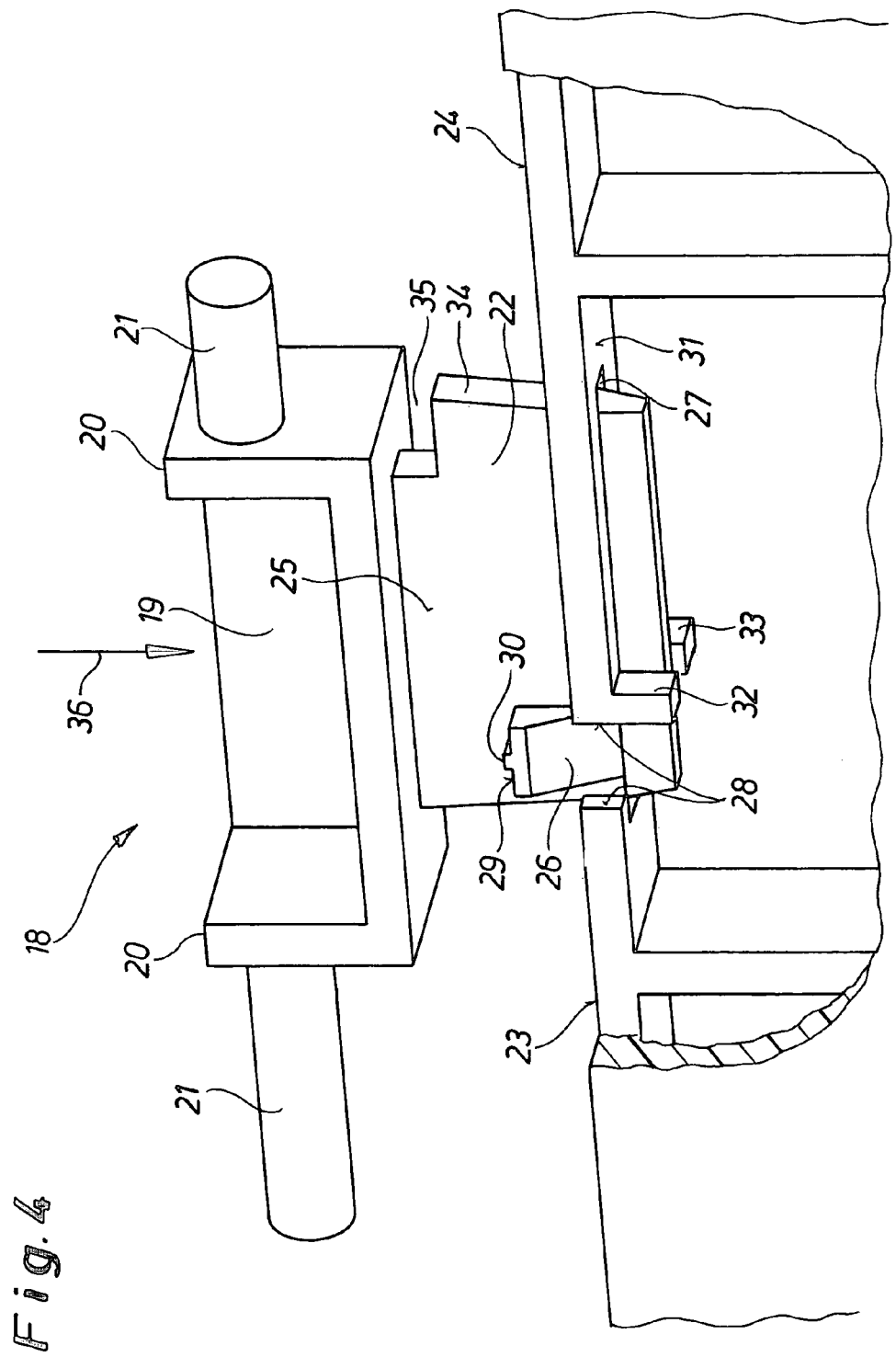
Figure 5:
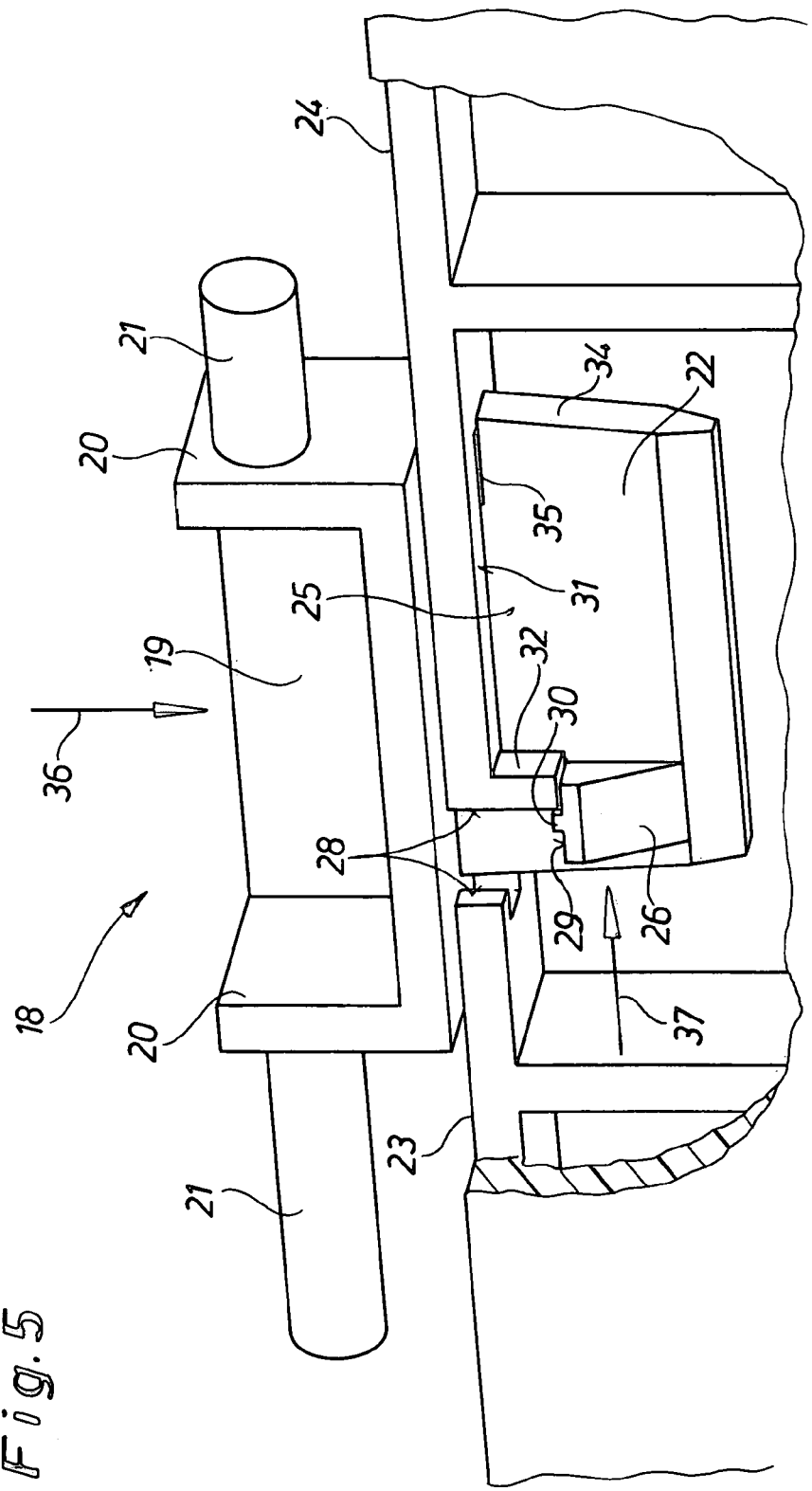

Thus, starting from the position of FIG. 3, the hinge 18 is aligned above the slot 27 with its wedge 26 aligned with the notch 28 and then is pushed down as shown by arrow 36 in FIG. 4. When the bottom of the upper part 19 comes to rest on an upper face 24 of the upper wall 23, the upper face 29 of the wedge 26 is below the lower end of the tab 32, but the ridge 30 still projects upward past this lower end, as shown in FIG. 5. From this position the hinge 18 is slid longitudinally as shown by arrow 37 so that the ridge 30 cams up and slides under the tab 32 to come to rest on its other side as shown in FIG. 6. At the same time the notch 35 moves past the end of the slot 27 so that the tongue 22 comes to bear upward on a lower face 31 of the upper flange 23, locking the hinge 18 solidly in place.

To remove the hinge 18, the tab 32 is deflected elastically and the entire hinge is shifted oppositely to the arrow 37 to align the wedge 26 with the cutout 28. Then it in raised opposite to the arrow 36 to return to the FIG. 3 position.

I claim:

1. A reusable transport/storage box comprising:
   a side wall having a horizontal upper flange formed with
      a longitudinally elongated and vertically throughgoing slot having a predetermined longitudinal effective length and formed with a transversely inwardly open short cutout;
   a cover panel; and
   a an insert hinge having
      an upper part pivoted on the cover panel,
      a flat insert tongue projecting downward from the upper part, fittable through the slot, and of an effective length shorter than the slot longitudinal effective length, whereby the tongue can shift longitudinally in the slot between opposite end positions, and
      a short bump projecting transversely and outwardly from the tongue and fittable vertically through the cutout, the tongue being insertable in one of the end positions through the slot with the bump passing through the cutout and then being longitudinally shiftable to the other of the end positions to displace the bump longitudinally at least partially past the cutout underneath the upper flange and thereby lock the hinge to the upper flange.

2. The reusable transport/storage box defined in claim 1 wherein the bump is wedge-shaped.

3. The reusable transport/storage box defined in claim 1 wherein the bump has an upper face formed with an upwardly projecting ridge.

4. The reusable transport/storage box defined in claim 3 wherein the ridge is centrally formed in the bump upper face.

5. The reusable transport/storage box defined in claim 3 wherein the upper flange is formed at a longitudinal end of the cutout with a downwardly projecting locking tab, the ridge moving from one longitudinal side of the tab to an opposite longitudinal side on longitudinal sliding of the tongue in the slot.

6. The reusable transport/storage box defined in claim 5 wherein the tongue has two transversely oppositely directed faces each provided with one such bump and ridge, the upper flange being formed with two such cutouts and to each side of the slot with one such locking tab.

7. The reusable transport/storage box defined in claim 1 wherein the tongue has a lower portion of a longitudinal dimension substantially greater than the predetermined longitudinal effective length.

8. The reusable transport/storage box defined in claim 1 wherein the upper part has at least one pivot pin seated in the cover panel.

9. The reusable transport/storage box defined in claim 1 wherein the upper part has a lower face flatly engageable with an upper surface of the upper flange.

10. A reusable transport/storage box comprising:
    a side wall having a horizontal upper flange formed with
       a longitudinally elongated and vertically throughgoing slot having a pair of opposite ends and a predetermined longitudinal effective length, the flange being formed adjacent one of the slot ends with a transversely inwardly open short cutout and between the cutout and the other end with a downwardly projecting locking tab;

a cover panel; and an insert hinge having an upper part pivoted on the cover panel, a flat insert tongue projecting downward from the upper part, fittable through the slot and of an effective length shorter than the slot longitudinal effective length, whereby the tongue can shift longitudinally in the slot between opposite end positions, and a short bump projecting transversely and outwardly from the tongue and fittable vertically through the cutout, the tongue being insertable in one of the end positions through the slot with the bump passing through the cutout and then being longitudinally shiftable to the other of the end positions to displace the bump at least partially longitudinally past the cutout and past the locking tab to thereby lock the hinge to the upper flange.

11. The reusable transport/storage box defined in claim 10 wherein the locking tab is provided immediately adjacent the cutout.

12. The reusable transport/storage box defined in claim 10 wherein the locking tab, tongue, and bump are dimensioned and positioned such that the locking tab is elastically deformed as the bump moves longitudinally past it.

* * * * *